(12) United States Patent
Alhuraifi et al.

(10) Patent No.: US 11,668,165 B2
(45) Date of Patent: Jun. 6, 2023

(54) METHOD AND SYSTEM FOR SIMULATING WELL PERFORMANCE USING WELLHEAD MEASUREMENTS

(71) Applicant: SAUDI ARABIAN OIL COMPANY, Dhahran (SA)

(72) Inventors: Mohammed A. Alhuraifi, Al-Qatif (SA); Mohammed H. Madan, Al-Qatif (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 382 days.

(21) Appl. No.: 16/808,721

(22) Filed: Mar. 4, 2020

(65) Prior Publication Data
US 2021/0277749 A1    Sep. 9, 2021

(51) Int. Cl.
*G06Q 50/00* (2012.01)
*G05B 13/04* (2006.01)
(Continued)

(52) U.S. Cl.
CPC .............. *E21B 43/00* (2013.01); *E21B 34/02* (2013.01); *E21B 41/00* (2013.01); *E21B 47/07* (2020.05);
(Continued)

(58) Field of Classification Search
CPC ...... E21B 41/0092; E21B 34/02; E21B 47/07; E21B 49/08; E21B 43/00; E21B 49/0875;
(Continued)

(56) References Cited

U.S. PATENT DOCUMENTS 4,969,130 A * 11/1990 Wason ................... G01V 1/42
367/37
5,992,519 A * 11/1999 Ramakrishnan ........ E21B 43/00
166/250.15
(Continued)

FOREIGN PATENT DOCUMENTS

CA      2200645 A1    4/1997
CA      2969796 A1    12/2017
(Continued)

OTHER PUBLICATIONS

Cimmino (Cimmino, M. (2017). Examination of ambient temperature variations effects on predicted fluid temperatures in vertical boreholes.) (Year: 2017).*
(Continued)

*Primary Examiner* — John E Johansen
(74) *Attorney, Agent, or Firm* — Osha Bergman Watanabe & Burton LLP

(57) ABSTRACT

A method may include obtaining wellhead temperature data from a wellhead coupled to a wellbore. The method may further include obtaining production data regarding the wellhead. The method may further include obtaining water cut data from the wellhead. The method may further include calibrating a production model for the wellhead based on the production data and the wellhead temperature data to generate a calibrated production model. The method may further include determining a predicted production rate of the wellhead using the calibrated production model, the water cut data, and flowing wellhead temperature data.

17 Claims, 7 Drawing Sheets

(51) Int. Cl.
| | |
|---|---|
| *E21B 43/00* | (2006.01) |
| *E21B 47/07* | (2012.01) |
| *E21B 34/02* | (2006.01) |
| *E21B 49/08* | (2006.01) |
| *G01V 99/00* | (2009.01) |
| *G05B 17/00* | (2006.01) |
| *E21B 41/00* | (2006.01) |

(52) U.S. Cl.
CPC ............ *E21B 49/08* (2013.01); *G01V 99/005* (2013.01); *G05B 13/04* (2013.01); *G05B 17/00* (2013.01); *G06Q 50/00* (2013.01); *E21B 49/0875* (2020.05); *E21B 2200/20* (2020.05)

(58) Field of Classification Search
CPC ... E21B 2200/20; E21B 41/00; G01V 99/005; G05B 13/04; G05B 17/00; G06Q 50/00
USPC .......................................................... 703/10
See application file for complete search history.

(56) References Cited

U.S. PATENT DOCUMENTS

| | | | | |
|---|---|---|---|---|
| 11,414,954 | B2* | 8/2022 | Ahmari | ................... E21B 47/07 |
| 2003/0103551 | A1 | 6/2003 | Haddad et al. | |
| 2005/0149264 | A1 | 7/2005 | Tarvin et al. | |
| 2007/0271039 | A1 | 11/2007 | Ella et al. | |
| 2007/0295501 | A1 | 12/2007 | Poulisse | |
| 2009/0198478 | A1 | 8/2009 | Cuevas et al. | |
| 2010/0023269 | A1* | 1/2010 | Yusti | ....................... E21B 43/00 |
| | | | | 702/12 |
| 2010/0076740 | A1 | 3/2010 | Kuchuk et al. | |
| 2015/0322773 | A1* | 11/2015 | Johnson | .................... G01F 1/68 |
| | | | | 702/12 |
| 2016/0154907 | A1 | 6/2016 | Halabe et al. | |
| 2016/0265300 | A1 | 9/2016 | Affleck | |
| 2017/0122085 | A1 | 5/2017 | Suheil | |
| 2017/0122097 | A1 | 5/2017 | Suheil et al. | |
| 2017/0122100 | A1* | 5/2017 | Mashetty | ............ E21B 49/0875 |
| 2017/0153358 | A1 | 6/2017 | Hansen | |
| 2017/0177761 | A1 | 6/2017 | Early et al. | |
| 2018/0011033 | A1 | 1/2018 | Karimi et al. | |
| 2018/0100374 | A1 | 4/2018 | Al-Dossary et al. | |

FOREIGN PATENT DOCUMENTS

| | | | | |
|---|---|---|---|---|
| GB | 2395035 A | | 5/2004 | |
| WO | WO-0162603 A2 | * | 8/2001 | ............. E21B 43/00 |
| WO | WO-2008104750 A1 | * | 9/2008 | ............. E21B 43/00 |
| WO | 2016195846 A1 | | 12/2016 | |
| WO | WO-2016195846 A1 | * | 12/2016 | ............. E21B 43/12 |
| WO | 2017011301 A1 | | 1/2017 | |
| WO | WO-2017011301 A1 | * | 1/2017 | ......... E21B 41/0092 |

OTHER PUBLICATIONS

Shi et al. (Shi, Y., Song, X., Wang, G., McLennan, J., Forbes, B., Li, X., & Li, J. (2019). Study on wellbore fluid flow and heat transfer of a multilateral-well CO2 enhanced geothermal system. Applied Energy, 249, 14-27.) (Year: 2019).*

Borgne et al. (Paillet, F. L., Hess, A. E., Cheng, C. H., & Hardin, E. (1987). Characterization of fracture permeability with high-resolution vertical flow measurements during borehole pumping. Groundwater, 25(1), 28-40.) (Year: 1987).*

Al-Shammari, et al. "Application of Real-Time Data and Integrated Models in an Automated Workflow for Production Surveillance and Analysis in Burgan Oil Field." In SPE Kuwait Oil & Gas Show and Conference. OnePetro, 2017. 15 pages (Year: 2017).*

Authors Unknown, "Multiphase Flow Technology—MSS3 Technical Description", Ensys Yocum Technical Paper, [Online] (Jan. 14, 2007), 19pages. Retrieved from URL:http://web.archive.org/web/20070114225835/http://wvvw-.ensysenergy.com/EY1+Files/VMSS3+Technical+Descript10n.pdf (retrieved on May 21, 2008]) (Year: 2008).*

Jadid, Kahila Mokhtari. Performance evaluation of virtual flow metering models and its application to metering backup and production allocation. Louisiana State University and Agricultural & Mechanical College, 2017. 120 pages (Year: 2017).*

Ma, Xiang, et al. "Real-time production surveillance and optimization at a mature subsea asset." In SPE Intelligent Energy International Conference and Exhibition. OnePetro, 2016. 16 pages (Year: 2016).*

Rao, Subba Rama, and Richard Mohan David. "Integrated Production Testing Framework to Improve Next Generation Production Workflows." In Abu Dhabi International Petroleum Exhibition and Conference. OnePetro, 2015 (Year: 2015).*

International Search Report issued in corresponding International Application No. PCT/US2020/026550, dated Nov. 27, 2020 (4 pages).

Written Opinion issued in corresponding International Application No. PCT/US2020/026550, dated Nov. 27, 2020 (5 pages).

* cited by examiner

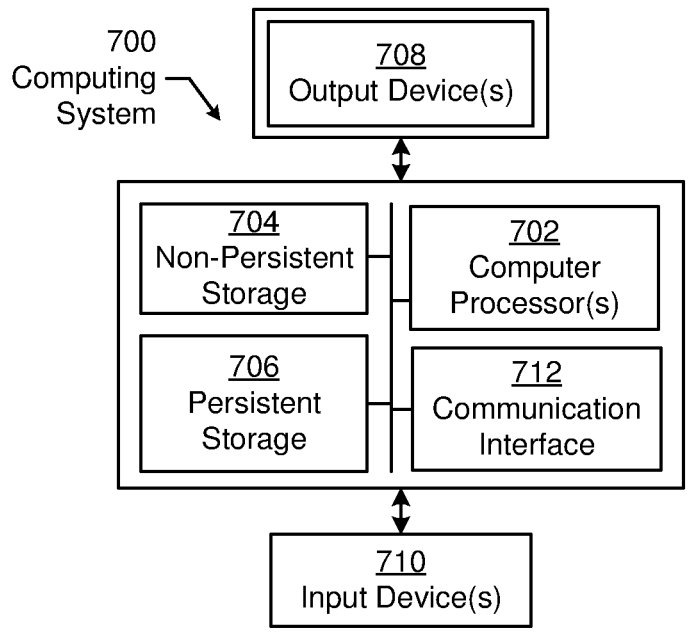
*FIG. 7.1*
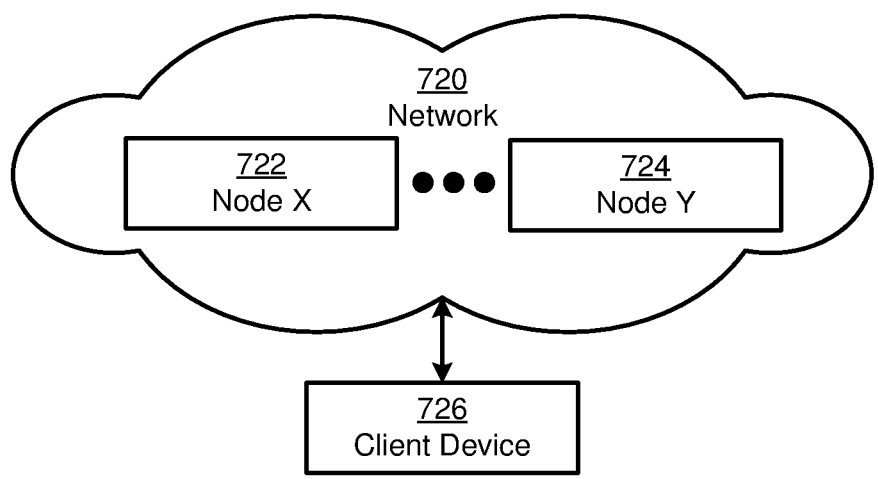
*FIG. 7.2*

METHOD AND SYSTEM FOR SIMULATING WELL PERFORMANCE USING WELLHEAD MEASUREMENTS

BACKGROUND

Well performance models play an important role in managing hydrocarbon production at various well sites. For example, a well performance model may calculate oil, water and gas production rates from a well in an oil and gas reservoir. If the well production rate is known, the well production rate may be used for determining a flow profile of the well. Likewise, regular swings in oil prices may cause well performance models to assist in determining well viability as well as manage future production forecasts.

SUMMARY

In general, in one aspect, embodiments relate to a method that includes obtaining wellhead temperature data from a wellhead coupled to a wellbore. The method further includes obtaining production data regarding the wellhead. The method further includes obtaining water cut data from the wellhead. The method further includes calibrating a production model for the wellhead based on the production data and the wellhead temperature data to generate a calibrated production model. The method further includes determining a predicted production rate of the wellhead using the calibrated production model, the water cut data, and flowing wellhead temperature data.

In general, in one aspect, embodiments relate to a system that includes a wellhead coupled to a wellbore, a wellhead temperature sensor coupled to the wellhead, a water cut sensor coupled to the wellhead, and a flow rate sensor coupled to the wellhead. The system further includes a control system including a computer processor and coupled to the wellhead temperature sensor and the water cut sensor. The control system obtains wellhead temperature data from the wellhead temperature sensor. The control system further obtains production data from a flow rate sensor regarding the wellhead. The control system further obtains water cut data from the water cut sensor. The control system further calibrates a production model for the wellhead based on the production data and the wellhead temperature data to generate a calibrated production model. The control system further determines a predicted production rate of the wellhead using the calibrated production model, the water cut data, and flowing wellhead temperature data.

In general, in one aspect, embodiments relate to a non-transitory computer readable medium storing instructions executable by a computer processor. The instructions obtain wellhead temperature data from a wellhead coupled to a wellbore. The instructions further obtain production data regarding the wellhead. The instructions further obtain water cut data from the wellhead. The instructions further calibrate a production model for the wellhead based on the production data and the wellhead temperature data to generate a calibrated production model. The instructions further determine a predicted production rate of the wellhead using the calibrated production model, the water cut data, and flowing wellhead temperature data.

Other aspects of the disclosure will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIGS. 7.1 and 7.2 show a computing system in accordance with one or more embodiments.

DETAILED DESCRIPTION

Figure 1:
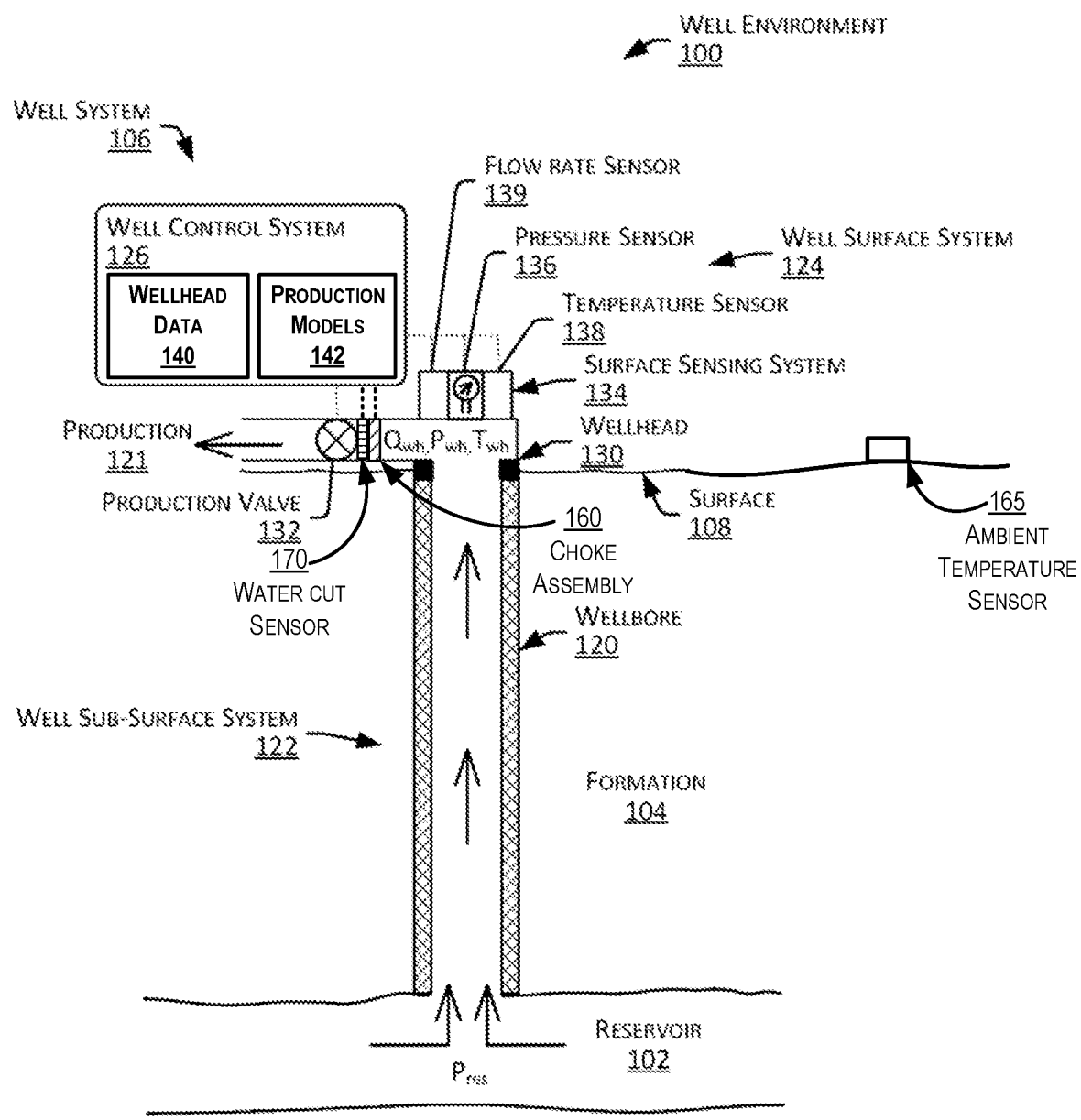
FIGS. 1 and 2 show systems in accordance with one or more embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for predicting well production rates using a calibrated production model. In some embodiments, for example, the calibrated production model simulates well performance, while providing updates in real-time. Specifically, a production rate may be predicted using the calibrated production model with water cut measurements and flowing wellhead temperature measurements obtained from a well system. As such, the calibrated production model may continuously estimate changes in oil production based on real-time data collected from a well system.

In some embodiments, the calibrated production model generates multiple production rate curves for different water cut levels. Once a production rate curve is selected, the corresponding production rate curve may be continually used where the well system has a constant gas-to-oil ratio in fluid flow from the well system. Furthermore, some embodiments enable the prediction of production rates, where the well system is not equipped with a permanent production rate monitoring device or a multi-phase flow meter that continuously monitors the well system.

Turning to FIG. 1, FIG. 1 shows a schematic diagram in accordance with one or more embodiments. As shown in FIG. 1, FIG. 1 illustrates a well environment (100) in accordance with one or more embodiments. In the illustrated embodiment, the well environment (100) includes a hydrocarbon reservoir ("reservoir") (102) located in a subsurface formation ("formation") (104) and a well system (106). The formation (104) may include a porous or fractured rock formation that resides underground, beneath the earth's surface ("surface") (108). In the case of the well system (106) being a hydrocarbon well, the reservoir (102) may include a portion of the formation (104) that includes a subsurface accumulation of hydrocarbons, such as oil and gas. The formation (104) and the reservoir (102) may include different layers of rock having varying characteristics, such as varying degrees of permeability, porosity, and resistivity. In the case of the well system (106) being operated as a production well, the well system (106) may facilitate the extraction of hydrocarbons (or "production") from the reservoir (102).

In some embodiments, the well system (106) includes a wellbore (120), a well sub-surface system (122), a well surface system (124), and a well control system ("control system") (126). The control system (126) may control various operations of the well system (106), such as well production operations, well completion operations, well maintenance operations, and reservoir monitoring, assessment and development operations. In some embodiments, the control system (126) includes a computer system that is the same as or similar to that of computer system 700 described below in FIGS. 7.1 and 7.2 and the accompanying description.

The wellbore (120) may include a drilled hole that extends from the surface (108) into a target zone of the formation (104), such as the reservoir (102). An upper end of the wellbore (120), terminating at or near the surface (108), may be referred to as the "up-hole" end of the wellbore (120), and a lower end of the wellbore, terminating in the formation (104), may be referred to as the "downhole" end of the wellbore (120). The wellbore (120) may facilitate the circulation of drilling fluids during drilling operations, the flow of hydrocarbon production ("production") (121) (e.g., oil and gas) from the reservoir (102) to the surface (108) during production operations, the injection of substances (e.g., water) into the formation (104) or the reservoir (102) during injection operations, or the deployment of monitoring devices (e.g., logging tools) into the formation (104) or the reservoir (102) during monitoring operations (e.g., during in situ logging operations).

In some embodiments, during operation of the well system (106), the control system (126) collects and records wellhead data (140) for the well system (106). The wellhead data (140) may include, for example, a record of measurements of wellhead pressure ($P_{wh}$) (e.g., including flowing wellhead pressure), wellhead temperature ($T_{wh}$) (e.g., including flowing wellhead temperature), wellhead production rate ($Q_{wh}$) over some or all of the life of the well (106), and water cut data. In some embodiments, the wellhead data (140) includes ambient temperature data that is obtained from an ambient temperature sensor (165) located a predetermined distance away from the wellhead (130) in order to measure the ground temperature around the well system (106). In some embodiments, the measurements are recorded in real-time, and are available for review or use within seconds, minutes or hours of the condition being sensed (e.g., the measurements are available within 1 hour of the condition being sensed). In such an embodiment, the wellhead data (140) may be referred to as "real-time" wellhead data (140). Real-time wellhead data (140) may enable an operator of the well (106) to assess a relatively current state of the well system (106), and make real-time decisions regarding development of the well system (106) and the reservoir (102), such as on-demand adjustments in regulation of production flow from the well.

In some embodiments, the control system (126) includes multiple production models (142). In particular, the production models (142) may simulate the well performance (100) as well as changes in various operations performed by the well system (106), such as well production operations. Likewise, the control system (126) may include functionality for predicting a future production rate using one or more of the production models (142). As such, the well control system (126) may also include functionality for calibrating and/or modifying one or more production models (142) using the wellhead data (140) collected in regard to the well environment (100).

In some embodiments, the well system (106) includes a water cut sensor (170). For example, a water cut sensor may be hardware and/or software with functionality for determining the water content in oil, also referred to as "water cut." Measurements from a water cut sensor may be referred to as water cut data and may describe the ratio of water produced from the wellbore (120) compared to the total volume of liquids produced from the wellbore (120). Water cut sensors may implement various water cut measuring techniques, such as those based on capacitance measurements, Coriolis effect, infrared (IR) spectroscopy, gamma ray spectroscopy, and microwave technology. Water cut data may be obtained during production operations to determine various fluid rates found in production from the well system (106).

With regard to microwave based water cut sensors, certain microwave-based water cut sensors may rely on measuring a phase difference between transmitted and received microwave signals. As such, the phase difference may have a direct link with the effective permittivity of the oil and water mixture from the wellbore (120). In some embodiments, microwave-based water cut sensors employ transmit (Tx) antennas and receive (Rx) antennas disposed inside of well system pipe, such that the antennas are at least partially immersed in the fluid mixture as the fluid flows through the pipe.

In some embodiments, the well system (106) includes a water cut sensing system that includes a water cut (WC) sensor, a cylindrical pipe, and/or a measurement processing system. The WC sensor may be disposed on (or otherwise integrated within) the cylindrical pipe. As such, the WC sensor may include a signal conductor (SC) (e.g., a first conductive plane), such as a T-resonator, disposed at a first/upper/top surface of the cylindrical pipe, and a ground conductor (GC) (e.g., a second conductive plane) disposed at a second/lower/bottom surface of the cylindrical pipe that is opposite the first/upper/top surface of the pipe. In such a configuration, the WC sensing system may be employed to sense a water cut of fluid obtained from the wellbore (120) (e.g., a water and oil mixture, or other substrates). In some embodiments, a WC sensor includes multiple waveguides that are attached to a production pipe, where a network analyzer may be connected to the waveguides. The network analyzer may be communicatively coupled with the well control system (126) to determine water cut data.

In some embodiments, the well sub-surface system (122) includes casing installed in the wellbore (120). For example the wellbore (120) may have a cased portion and an uncased (or "open-hole") portion. The cased portion may include a portion of the wellbore having casing (e.g., casing pipe and casing cement) disposed therein. The uncased portion may include a portion of the wellbore not having casing disposed therein. In some embodiments, the casing includes an annular casing that lines the wall of the wellbore (120) to define a central passage that provides a conduit for the transport of tools and substances through the wellbore (120). For example, the central passage may provide a conduit for lowering logging tools into the wellbore (120), a conduit for the flow of production (121) (e.g., oil and gas along with produced water) from the reservoir (102) to the surface (108), or a conduit for the flow of injection substances (e.g., water) from the surface (108) into the formation (104). In some embodiments, the well sub-surface system (122) includes production tubing installed in the wellbore (120). The production tubing may provide a conduit for the transport of tools and substances through the wellbore (120). The production tubing may, for example, be disposed inside casing. In such an embodiment, the production tubing may provide a conduit for some or all of the production (121) (e.g., oil and gas along with produced water) passing through the wellbore (120) and the casing.

In some embodiments, the well surface system (124) includes a wellhead (130). The wellhead (130) may include a rigid structure installed at the "up-hole" end of the wellbore (120), at or near where the wellbore (120) terminates at the Earth's surface (108). The wellhead (130) may include structures for supporting (or "hanging") casing and production tubing extending into the wellbore (120). Production (121) may flow through the wellhead (130), after exiting the wellbore (120) and the well sub-surface system (122), including, for example, the casing and the production tubing. In some embodiments, the well surface system (124) includes flow regulating devices that are operable to control the flow of substances into and out of the wellbore (120). For example, the well surface system (124) may include one or more choke assemblies (160) that are operable to control the flow of production (134). For example, a choke assembly (160) may be fully opened to enable unrestricted flow of production (121) from the wellbore (120), the choke assembly (160) may be partially opened to partially restrict (or "throttle") the flow of production (121) from the wellbore (120), and production valve (132) may be fully closed to fully restrict (or "block") the flow of production (121) from the wellbore (120), and through the well surface system (124).

In some embodiments, the wellhead (130) includes a choke assembly (160). For example, the choke assembly may include hardware with functionality for opening and closing the fluid flow through pipes in the well system (106). Likewise, the choke assembly (160) may include a pipe manifold that may lower the pressure of fluid traversing the wellhead. As such, the choke assembly (160) may include set of high-pressure valves and sometimes two chokes. These chokes may be fixed or adjustable or a mix of both. Redundancy may be provided so that if one choke has to be taken out of service, the flow can be directed through another choke. In some embodiments, pressure valves and chokes are communicatively coupled to the well control system (126). Accordingly, a well control system (126) may obtain wellhead data regarding the choke assembly (160) as well as transmit one or more commands to components within the choke assembly in order to adjust one or more choke assembly parameters. For more information on the choke assembly, see FIG. 2 and the accompany description below.

Keeping with FIG. 1, in some embodiments, the well surface system (124) includes a surface sensing system (134). The surface sensing system (134) may include sensors for sensing characteristics of substances, including production (121), passing through or otherwise located in the well surface system (124). The characteristics may include, for example, pressure, temperature and flow rate of production (121) flowing through the wellhead (130), or other conduits of the well surface system (124), after exiting the wellbore (120).

In some embodiments, the surface sensing system (134) includes a surface pressure sensor (136) operable to sense the pressure of production (151) flowing through the well surface system (124), after it exits the wellbore (120). The surface pressure sensor (136) may include, for example, a wellhead pressure sensor that senses a pressure of production (121) flowing through or otherwise located in the wellhead (130). In some embodiments, the surface sensing system (134) includes a surface temperature sensor (138) operable to sense the temperature of production (151) flowing through the well surface system (124), after it exits the wellbore (120). The surface temperature sensor (138) may include, for example, a wellhead temperature sensor that senses a temperature of production (121) flowing through or otherwise located in the wellhead (130), referred to as "wellhead temperature" ($T_{wh}$). In some embodiments, the surface sensing system (134) includes a flow rate sensor (139) operable to sense the flow rate of production (151) flowing through the well surface system (124), after it exits the wellbore (120). The flow rate sensor (139) may include hardware that senses a flow rate of production (121) ($Q_{wh}$) passing through the wellhead (130).

Figure 2:
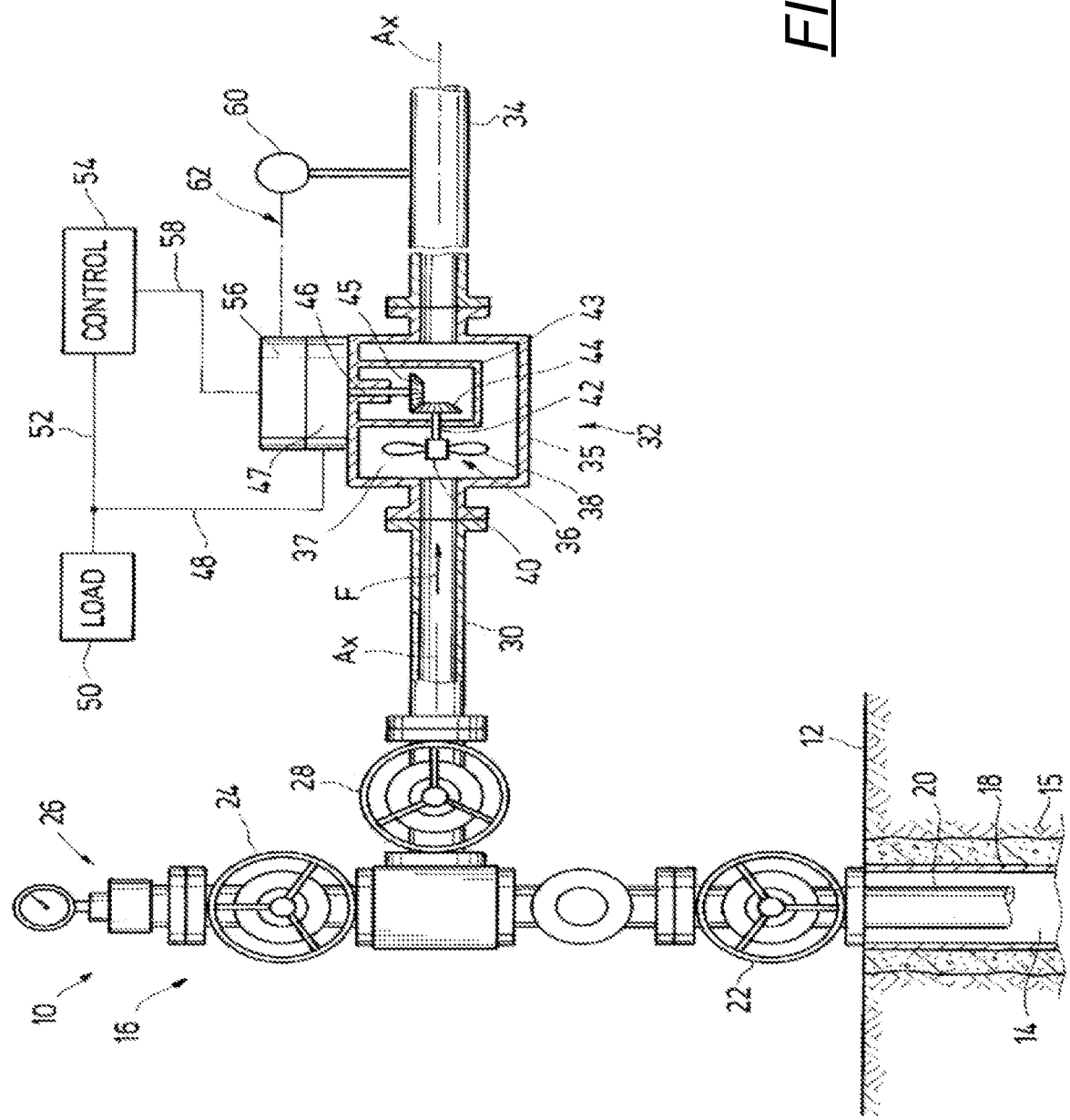

Turning to FIG. 2, FIG. 2 shows a schematic diagram in accordance with one or more embodiments. As shown in FIG. 2, a wellhead assembly (10) is mounted on a surface (12) and over a wellbore (14) that intersects a subterranean formation (15). The wellhead assembly (10) may include a production tree (16) for controlling fluid produced from a formation (15). Casing (18) is shown depending into wellbore (14) downward from a lower end of wellhead assembly (10) and which lines the wellbore (14). Production tubing (20) may be inserted within casing (18). Production tubing (20) may provide a conduit for delivering the fluid to the wellhead assembly (10). A master valve (22) is shown provided on a portion of production tree (16) proximate to surface (12), which may selectively be opened and closed to allow access into the production tubing (20) through production tree (16). A swab valve (24) is also included on production tree (16) proximate its upper end, opening and closing swab valve (24) may allow selective access to a main bore (not shown) within production tree (16) from above the production tree (16). A tree cap (26) with gauge is shown mounted on an upper end of production tree (16) and above swab valve (24). Production tree (16) also includes a wing valve (28) illustrated coupled between a mid-portion of production tree (16) and a production line (30) that extends laterally from production tree (16). Attached to an end of production line (30) opposite from production line (30) is an example of a choke assembly (32). The choke assembly (32) may regulate fluid flow through the production line (30). On an end of choke assembly (32) opposite from production line (30) is a production line (34), in which one example sends production fluid from wellhead assembly (10) to remote sites for storage and/or processing.

In the illustrated example, choke assembly (32) includes a housing (35), and a turbine member (36), where turbine member (36) is disposed in a chamber (37) formed in housing (35). Turbine member (36) may be selectively rotatable in response to a flow of fluid F flowing through production line (30) and into chamber (37). In the example of FIG. 2, a number of turbine elements (38) are provided with turbine member (36) and that are strategically formed to impart a rotational force onto turbine member (36) in response to the flow of fluid F, thereby causing turbine member (36) to rotate. The turbine elements (38) may each project radially outward from a hub (40). In one embodiment, hub (40) is generally coaxial with an axis AX of a production line (30). A shaft (42) is shown inserted into hub (40), while the turbine element (36) mounts to shaft (42) via a coupling between hub (40) and shaft (42) so that shaft (42) rotates with rotation of turbine element (36).

Keeping with FIG. 2, production lines (30, 34) may be generally aligned with one another so that the path of the flow of fluid F through chamber (37) is substantially unchanged. Supporting the shaft (42) and turbine member (36) in the flow of fluid F is a transmission system (43) shown depending into chamber (37) from an inner surface of housing (35), and between where housing 35 connects to lines 30, 34. In the transmission system (43) a rotational axis of the kinetic energy of the rotating turbine member (36) may change from an orientation that is substantially parallel with axis AX to one that is substantially perpendicular with axis AX. More specifically, an end of shaft (42) disposed within transmission system (43) includes a gear (44) that meshes with a gear (45), where gears (44, 45) are disposed in planes that are substantially perpendicular to one another. Moreover, the outer peripheral ends of gears (44, 45) are set adjoining one another so that teeth on the ends of the gears (44, 45) intermesh. Thus rotating gear (44), such as in response to rotation of shaft (42), may cause gear (45) to rotate about its axis.

An end of a shaft (46) coaxially inserts into gear (45), where an end of shaft (46) distal from gear (45) is coupled to a generator (47) shown mounted outside of housing (35). In an example, generator (47) may produce electricity from the kinetic energy of the rotating shaft (46), and thus that of turbine member (36). A line (48) is shown extending from an output end of generator (47) to a load (50), which may thereby provide electricity from generator (47) to load (50). In some embodiment, load 50 may represent one or more devices that consume electricity and are adjacent the wellhead assembly (10). Examples of the devices within load element (50) may include lighting, sensors, gauges, detectors, and flow meters. Another line (52) is shown connected between line (48) and a controller (54). As such, line (52) may provide communication between generator (47) and load element (50) to controller (54). In some embodiments, controller (54) may be hardware and/or software that provides control signals to generator (47), load element 50, and other components in the well assembly (10). In some embodiments, controller (54) is similar to the computing system (700) describes below in FIG. 7 and the accompanying description.

A brake system (56) is shown mounted adjacent to generator (47). Processing hardware and software for controlling operation of the brake system (56) may be provided in brake system (56), in controller (54), or another information handling system. Brake system (56) is coupled with shaft (46), and may selectively provide resistance onto shaft (46), thereby impeding or retarding the rotation of turbine member (36). Line (58) is shown connected between controller (54) and brake system (56), and through which communication between controller (54) and brake system (56) may occur. In one embodiment, a sensor (60) is shown mounted onto production line (34) and which senses conditions within production line (34), such as pressure, temperature, fluid flowrate, and the like. A communication line (62) provides communication between sensor 60 and brake system (56), and also controller (54). Accordingly, based on feedback of conditions monitored by sensor (60) downstream of choke assembly (32), the brake system (56) may be activated to partially or fully restrict rotation of the turbine member (36) via its coupling with shaft (46). Because a pressure drop of the flow of fluid F across turbine member (36) when its rotation is restricted is greater than a pressure drop across the turbine member (36) when it is rotating freely in the flow of fluid F, the flow of fluid F downstream of the choke assembly (32) may be regulated or controlled by restricting rotation of the turbine member (36).

While FIGS. 1 and 2 show various configurations of components, other configurations may be used without departing from the scope of the disclosure. For example, various components in FIGS. 1 and 2 may be combined to create a single component. As another example, the functionality performed by a single component may be performed by two or more components.

Figure 3:
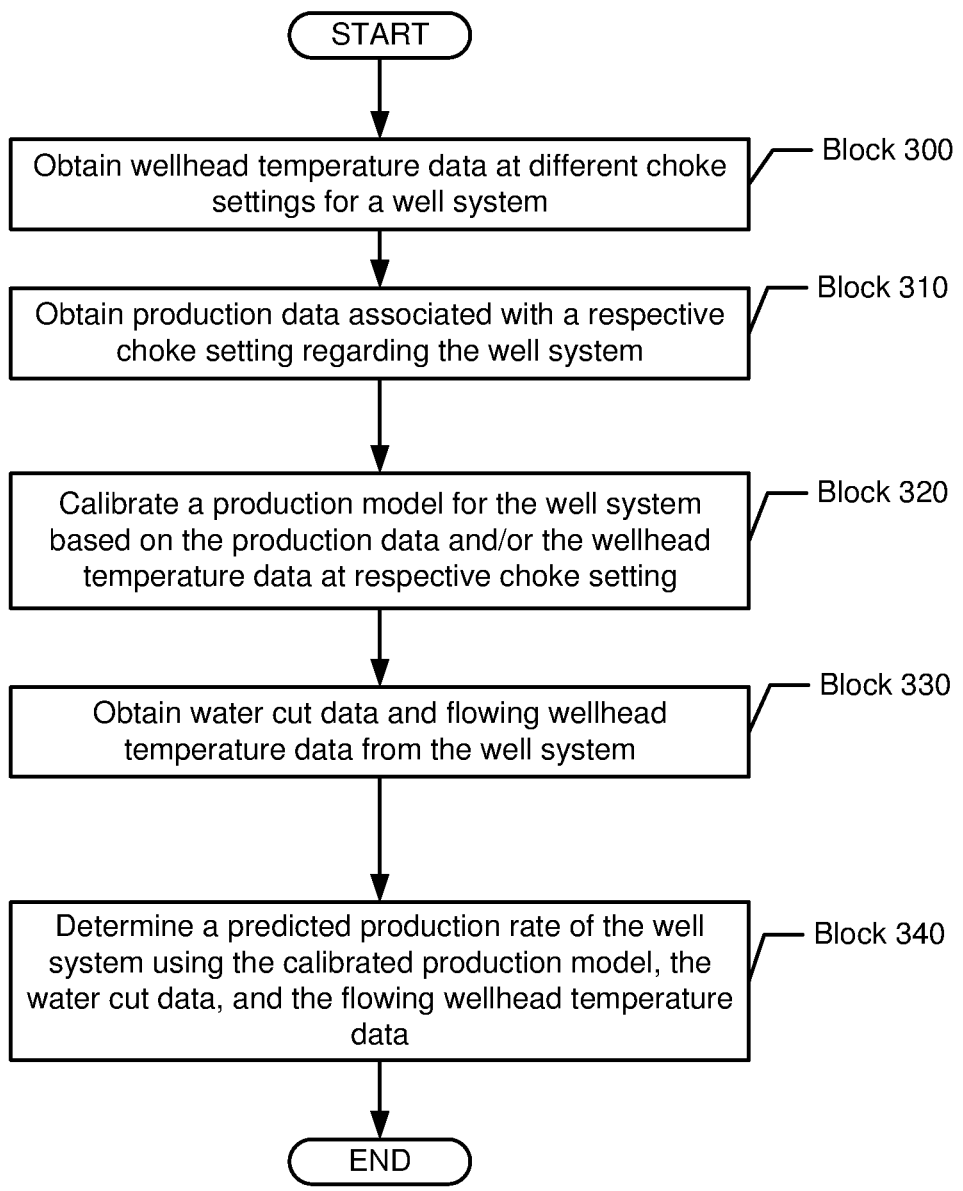
FIG. 3 shows a flowchart in accordance with one or more embodiments.

Turning to FIG. 3, FIG. 3 shows a flowchart in accordance with one or more embodiments. Specifically, FIG. 3 describes a general method for determining a predicted production rate for a well system using a calibrated production model. One or more blocks in FIG. 3 may be performed by one or more components (e.g., well control system (126)) as described in FIGS. 1-2. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 300, wellhead temperature data is obtained at different choke settings for a well system in accordance with one or more embodiments. In particular, wellhead temperature data may be acquired at a wellhead using a temperature sensor similar to temperature sensor (138) described above in FIG. 1 and the accompanying description. In some embodiments, the wellhead temperature data is acquired using different choke settings of a choke assembly in a wellhead. For example, different choke settings may produce different fluid pressures and flowrates of the fluid passing through the wellhead. Thus, different choke settings may also result in different wellhead temperature measurements at the wellhead.

In Block 310, production data associated with a respective choke setting is obtained for a well system in accordance with one or more embodiments. Production data may correspond to the wellhead production rate measurements described above in FIG. 1 and the accompanying description. In particular, production data may be acquired at a wellhead using a flow rate sensor similar to flow rate sensor (139) described above in FIG. 1 and the accompanying description. In some embodiments, the flow rate sensor (139) is not a multi-phase flow rate sensor. In some embodiments, the flow rate sensor (139) might be portable or installed in Gas Oil Separation Plants.

In Block 320, a production model is calibrated for a well system based on production data and/or wellhead temperature data at a respective choke setting in accordance with one or more embodiments. More specifically, a production model may simulate phases of oil, gas, and water in fluid acquired from a reservoir through a wellbore. For example, a production model may be a hydraulic simulation model that uses well geometry of a wellhead and a wellbore, pressure-volume-temperature (PVT) data, reservoir pressure at shut-in conditions, and/or flowline steady-state temperatures to model production from the well system. Moreover, a production model may be based on acquired reservoir data, e.g., based on well logs and/or production logs acquired from other wells. Thus, a production model may use well data from different sources in order to simulate the flow of production from a particular wellhead.

Keeping with Block 320, in some embodiments, a production model is calibrated by determining a particular heat transfer coefficient. In particular, a heat transfer coefficient may describe heat transfer due to the difference between a bulk fluid temperature of fluid flowing through a wellhead and the ambient temperature in the subsurface surrounding the respective wellbore. For example, a heat transfer rate at a well system may depend on various thermal resistances such as fluid type, water cut, and/or the type of ground medium around a wellbore. As such, the heat transfer coefficient may be determined using wellhead temperature data acquired using different choke settings and ambient temperature data. More specifically, a heat transfer coefficient may be expressed using the following equation:

$$Q = UA(T_b - T_a) \quad \text{Equation 1}$$

where Q is an amount of heat transfer, A is an area of heat loss relating to the wellhead, $T_b$ is a fluid temperature of fluid flowing through a wellhead, $T_a$ is an ambient temperature of the sub-surface around the wellbore, and U is the heat transfer coefficient between the wellhead and the surrounding area. The fluid temperature may be obtained using a temperature as described above in Block 300. Likewise, the ambient temperature of Equation 1 may be obtained using an ambient temperature sensor similar to ambient sensor (165) described above in FIG. 1 and the accompanying description. In some embodiments, a production model is calibrated multiple times. For example, the production model may be tested using wellhead temperature data acquired at different times in order to determine a calibrated production model that may account for changes in production conditions. Likewise, the predicted production rates from the calibrated production model may be compared with the actual production rates from other wells in order to determine whether one or more parameters in the production model need to be updated accordingly In Block 330, water cut data and flowing wellhead temperature data are obtained for a well system in accordance with one or more embodiments. In particular, water cut data may be acquired at a wellhead using a water cut sensor similar to water cut sensor (170) or the water cut sensing system described above in FIG. 1 and the accompanying description. The flowing wellhead temperature data may be wellhead temperature data acquired in real-time from a flow rate sensor.

In Block 340, a predicted production rate of a well system is determined using a calibrated production model, water cut data, and/or flowing wellhead temperature data in accordance with one or more embodiments. Using a calibrated production model, a production rate of a well system can be predicted from water cut measurements and wellhead temperature data. Thus, in some embodiments, a predicted production rate of a well system may be determined without using a multi-phase flow sensor in the well system.

In some embodiments, the predicted production rate of a well system is determined in real time. For example, rather than performing various complicated simulations of production at a well system using reservoir and well system properties, a calibrated production model may determine the prediction production rate using a predetermined curve or table based on water cut values and wellhead temperature data as real-time inputs to the calibrated production model. Thus, the calibrated production model may eliminate some unnecessary equipment at the well system as well as provide real-time notifications of future changes in production.

Figure 4:
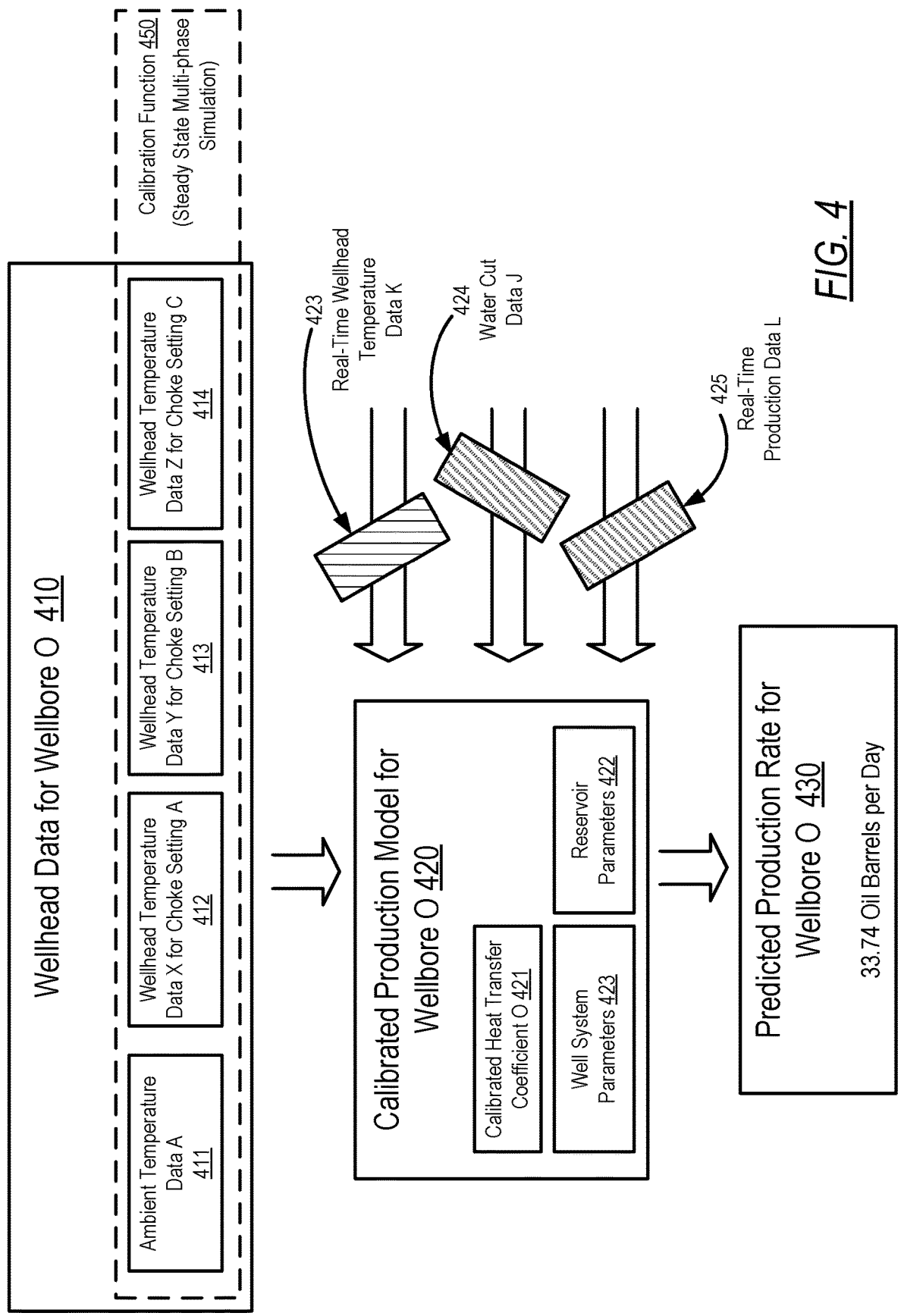
FIG. 4 shows an example in accordance with one or more embodiments.

Turning to FIG. 4, FIG. 4 provides an example of predicting a well production rate using a calibrated production model. The following example is for explanatory purposes only and not intended to limit the scope of the disclosed technology.

In FIG. 4, wellhead data (410) is collected regarding a wellhead of wellbore O. In particular, the wellhead data (410) includes ambient temperature data A (411) that was collected a distance away from wellbore O as well as wellhead temperature data (412, 413, 414) collected at the wellhead coupled to wellbore O. Here, a well control system obtains wellhead temperature data X (412), wellhead temperature data Y (413), and wellhead temperature data Z (414) based on choke setting A, choke setting B, and choke setting C, respectively, of a choke assembly in the wellhead.

In order to calibrate a steady-state production model for wellbore O, a calibration function (450) is performed using the wellhead data (410) with the production model. In particular, the calibration function (450) is based on a steady state multi-phase simulation that uses a particular heat transfer function to produce a calibrated production model (420). For example, the heat transfer function may correspond to Equation 1 above. Likewise, the calibration function (450) may be performed by a well control system to produce a calibrated heat transfer coefficient S (421) based on the heat transfer function. The calibrated production model may also include various reservoir parameters (422) and various well system parameters (423).

Keeping with FIG. 4, to predict a production rate of wellbore O, the calibrated production model (420) obtains various inputs: real-time wellhead temperature data K (423), water cut data J (424), and real-time production data L (425). Based on the inputs, the calibrated production model (420) determines a predicted production rate of 33.74 oil barrels per data for wellbore O. Accordingly, the calibrated production model (420) obtains regular updates regarding wellhead temperature data and production data. Using the updates, the calibrated production model may be subsequently used to predict respective production rates, accordingly.

Figure 5:
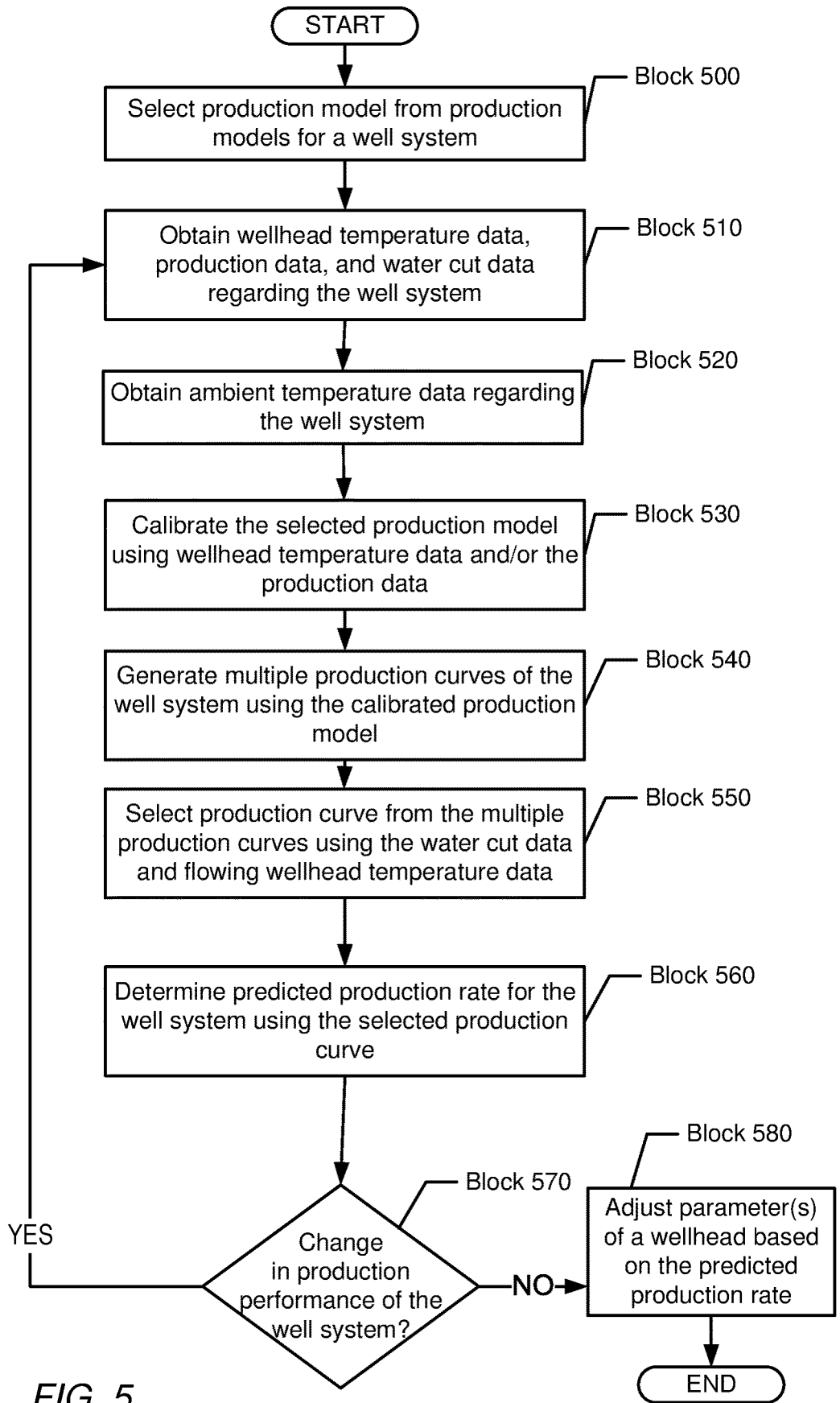
FIG. 5 shows a flowchart in accordance with one or more embodiments.

Turning to FIG. 5, FIG. 5 shows a flowchart in accordance with one or more embodiments. Specifically, FIG. 5 describes a general method for determining a predicted production rate for a well system using a calibrated production model. One or more blocks in FIG. 5 may be performed by one or more components (e.g., well control system (126)) as described in FIGS. 1-2. While the various blocks in FIG. 5 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 500, a production model is selected from various production models for a well system in accordance with one or more embodiments. For example, different types of production models may be available depending on a particular type of reservoir and/or well system, e.g., for horizontal wells, enhanced recovery wells, etc. Accordingly, a production model may be selected that corresponds to the well system parameters and/or reservoir parameters of a particular well system. In some embodiments, a well control system automatically selects the production model based on various inputs of well system parameters and/or reservoir parameters.

In Block 510, wellhead temperature data, production data, and water cut data are obtained regarding a well system in accordance with one or more embodiments. For example, steady-state data may be obtained for wellhead temperature data, production data, and water cut data in a similar manner as described above in Blocks 300, 310, and 330 and the accompanying description.

In Block 520, ambient temperature data is obtained regarding a well system in accordance with one or more embodiments. In regard to a well system, ambient temperature may be the ground temperature at a distance far from the well system. Accordingly, a temperature sensor may be disposed at predetermined distance from a well system in order to measure the ambient temperature around a well system.

In Block 530, a selected production model is calibrated using wellhead temperature data and/or production data in accordance with one or more embodiments. For example, a production model may be calibrated in a similar manner as described above in Block 320 and the accompanying description.

In Block 540, multiple production curves are generated of a well system using a calibrated production model in accordance with one or more embodiments. Once a production model is calibrated, a well control system may simulate different flowing wellhead temperature (FWHT) with respect to production rate of a well system for different water cut values. In some embodiments, for example, a well control system may generate multiple production curves.

Figure 6:
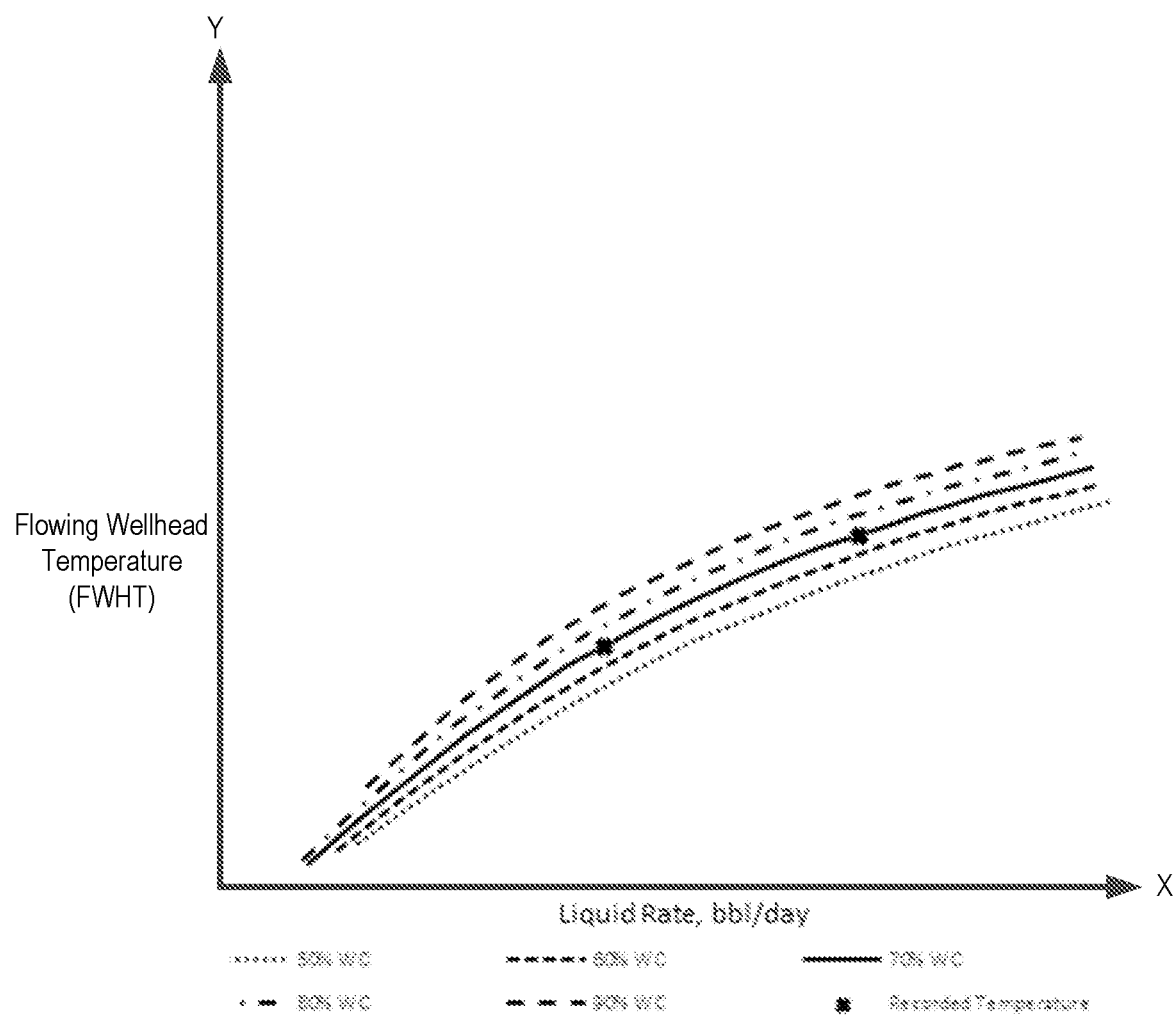
FIG. 6 shows an example in accordance with one or more embodiments.

Turning to FIG. 6, FIG. 6 provides an example of multiple production rate curves generated using a calibrated production model. The following example is for explanatory purposes only and not intended to limit the scope of the disclosed technology. Turning to FIG. 6, FIG. 6 shows five different production rate curves corresponding to different water cut (WC) levels at a well system, i.e., a 50% WC level, a 60% WC level, a 70% WC level, an 80% WC level, and a 90% WC level. The y-axis of FIG. 6 corresponds to flowing wellhead temperature (FWHT), while the x-axis of FIG. 6 corresponds to a predicted production rate as measured by barrels per day. In FIG. 6, the production rate curve for 70% level is selected based on water cut data obtained for a corresponding wellbore. Moreover, two x-shapes on the 70% WC level production curve corresponds to two respective flowing wellhead temperatures (FWHTs) acquired for a well system. Likewise, as illustrated in FIG. 6, the predicted production rate changes as the flowing wellhead temperature changes.

Returning to Block 540 of FIG. 5, in some embodiments, one or more production tables are generated for a well system. For example, a well control system may generate a look-up table that associates a particular production rate for a respective wellhead temperature value and a respective water cut value. The well control system may use such a look-up table to determine a predicted production rate in real time using acquired temperature measurements and/or water cut measurements.

In Block 550, a production curve is selected from multiple production curves using water cut data and/or flowing wellhead temperature data in accordance with one or more embodiments. In some embodiments, one of the various production curves may be selected automatically in response to a detected change in water cut data. Likewise, in some embodiments that use a production table, a well control system may select a predetermined production table using water cut data acquired in real time.

In Block 560, a predicted production rate is determined for a well system using a selected production curve in accordance with one or more embodiments. Using a selected production curve or production table, a predicted production rate may be obtained for a well system. Likewise, a predicted production rate may be determined in a similar manner as described above in Block 340 and the accompanying description.

In Block 570, a determination is made whether a change in production performance has occurred in a well system in accordance with one or more embodiments. For example, a well control system may monitor wellhead temperature data, water cut data, and/or production data to detect any changes in production performance. For example, if well performance behavior changes are detected in a well system, a well control system may repeat one or more of blocks 510-550 to determine whether the production rate for the well system has changed. Likewise, if a change is detected, a production model may be recalibrated using wellhead temperature data from multiple choke settings again. Where a production curve is selected, different wellhead temperature data values may confirm that the selected production curve still applies but a change has occurred in the production rate. Accordingly, production performance may correspond to a measured production rate as well as other parameters of the underlying reservoir and/or well system that may indicate an increase or decrease in the production rate.

When a determination is made that production performance of a well system has changed, the process may proceed to Block 510. When a determination is made that the production performance has not changed, the process may return to Block 580.

In Block 580, one or more parameters of a wellhead are adjusted based on a predicted production rate in accordance with one or more embodiments. For example, using a predicted production rate, a well control system may transmit one or more commands to components in a well system in order to adjust production operations at a well system. For example, where administration of the wellhead is automated without human intervention, the well control system may automatically transmit commands to increase and/or decrease a production rate based on predetermined criteria, e.g., reducing production until the price of oil increases beyond a particular threshold.

Embodiments may be implemented on a computing system. Any combination of mobile, desktop, server, router, switch, embedded device, or other types of hardware may be used. For example, as shown in FIG. 7.1, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system (700) in FIG. 7.1 may be connected to or be a part of a network. For example, as shown in FIG. 7.2, the network (720) may include multiple nodes (e.g., node X (722), node Y (724)). Each node may correspond to a computing system, such as the computing system shown in FIG. 7.1, or a group of nodes combined may correspond to the computing system shown in FIG. 7.1. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (700) may be located at a remote location and connected to the other elements over a network.

Although not shown in FIG. 7.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7.1. Further, the client device (726) may include and/or perform all or a portion of one or more embodiments of the disclosure.

The computing system or group of computing systems described in FIGS. 7.1 and 7.2 may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system (700) in FIG. 7.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 7.1, while performing one or more embodiments of the disclosure, may perform data comparison. Data comparison may be used to compare two or more data values (e.g., A, B). For example, one or more embodiments may determine whether $A>B$, $A=B$, $A!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 7.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 7.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 7.1 and the nodes and/or client device in FIG. 7.2. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method, comprising:
   obtaining, using a first temperature sensor coupled to a wellhead, first wellhead temperature data from Flail the wellhead in a well system coupled to a wellbore;
   obtaining, using a second temperature sensor that is a predetermined distance away from the wellhead, ambient temperature data regarding a wellsite;
   obtaining a plurality of well system parameters for the well system at the wellhead;
   obtaining first production data regarding the wellhead;
   obtaining water cut data from the wellhead;
   calibrating, by a well control system coupled to the first temperature sensor and the second temperature sensor, a production model for the wellhead based on the first production data, the ambient temperature data, and the first wellhead temperature data to generate a calibrated production model;
   determining, by the well control system, a predicted production rate of the wellhead using the calibrated production model, the water cut data, and flowing wellhead temperature data;
   determining, by the well control system and in response to determining the predicted production rate, an adjusted parameter for the well system based on the predicted production rate,
   wherein the adjusted parameter corresponds to a well system parameter among the plurality of well system parameters; and
   transmitting, automatically by the well control system, one or more commands to a choke assembly in the well system to implement the adjusted parameter.

2. The method of claim 1, further comprising:
   generating a plurality of production curves using the calibrated production model, wherein the plurality of production curves correspond to different water cut levels; and
   selecting a production curve from the plurality of production curves using the water cut data, and
   wherein the predicted production rate is determined using the selected production curve.

3. The method of claim 1,
   wherein the calibrated production model is updated in real-time using second wellhead temperature data and second production data that are obtained from a production operation using the wellhead.

4. The method of claim 1,
   wherein the first wellhead temperature data is obtained using a plurality of choke settings for a choke assembly in the wellhead.

5. The method of claim 1, further comprising:
   determining, based on a predetermined heat transfer function, a plurality of heat transfer values using the ambient temperature data and the first wellhead temperature data,
   wherein the production model is calibrated by calibrating a heat transfer coefficient of the predetermined heat transfer function using the plurality of heat transfer values.

6. The method of claim 1, further comprising:
   determining a change in a production rate of the wellhead has occurred; and
   obtaining, in response to determining that the change has occurred, second wellhead temperature data and second production data regarding the wellhead; and
   calibrating the calibrated production model using the second wellhead temperature data and the second production data.

7. A system, comprising:
   a well system comprising:
   a wellhead coupled to a wellbore,
   a choke assembly coupled to the wellhead,
   a first temperature sensor coupled to the wellhead,
   a water cut sensor coupled to the wellhead,
   a second temperature sensor that is a predetermined distance away from the wellhead, and
   a flow rate sensor coupled to the wellhead; and
   a well control system comprising a computer processor and coupled to the first temperature sensor and the water cut sensor, wherein the well control system comprises functionality for:
   obtaining, using the first temperature sensor, first wellhead temperature data;
   obtaining, using the second temperature sensor, ambient temperature data regarding a wellsite comprising the well system;
   obtaining a plurality of well system parameters for the well system at the wellhead;
   obtaining first production data from the flow rate sensor regarding the wellhead;
   obtaining water cut data from the water cut sensor;
   calibrating a production model for the wellhead based on the first production data, the ambient temperature data, and the first wellhead temperature data to generate a calibrated production model; and determining a predicted production rate of the wellhead using the calibrated production model, the water cut data, and flowing wellhead temperature data;

determining, in response to determining the predicted production rate, an adjusted parameter for the well system based on the predicted production rate, wherein the adjusted parameter corresponds to a well system parameter among the plurality of well system parameters; and transmitting automatically one or more commands to the choke assembly in the well system to implement the adjusted parameter.

8. The system of claim 7, wherein the well control system further comprises functionality for:

generating a plurality of production curves using the calibrated production model, wherein the plurality of production curves correspond to different water cut levels; and selecting a production curve from the plurality of production curves using the water cut data, and wherein the predicted production rate is determined using the selected production curve.

9. The system of claim 7, wherein the system does not include a multi-phase flow meter coupled to the wellhead.

10. The system of claim 7, wherein the calibrated production model is updated in real-time by the well control system using second wellhead temperature data from the first temperature sensor and second production data regarding the wellhead.

11. The system of claim 7, wherein the well control system further comprises functionality for:

determining, based on a predetermined heat transfer function, a plurality of heat transfer values using the ambient temperature data and the first wellhead temperature data, wherein the production model is calibrated by calibrating a heat transfer coefficient of the predetermined heat transfer function using the plurality of heat transfer values.

12. The system of claim 7, wherein the well control system further comprises functionality for:

determining a change in a production rate of the wellhead has occurred; and obtaining, in response to determining that the change has occurred, second wellhead temperature data and second production data regarding the wellhead; and calibrating the calibrated production model using the second wellhead temperature data and the second production data.

13. A non-transitory computer readable medium storing instructions executable by a computer processor, the instructions comprising functionality for:

obtaining, using a first temperature sensor coupled to a wellhead, first wellhead temperature data regarding a wellhead coupled to a wellbore;

obtaining, using a second temperature sensor that is a predetermined distance away from the wellhead, ambient temperature data regarding a wellsite, wherein the first temperature sensor and the second temperature sensor are coupled to a well control system;

obtaining a plurality of well system parameters for a well system at the wellhead;

obtaining first production data regarding the wellhead;

obtaining water cut data regarding the wellhead;

calibrating a production model for the wellhead based on the first production data, the ambient temperature data, and the first wellhead temperature data to generate a calibrated production model; and determining a predicted production rate of the wellhead using the calibrated production model, the water cut data, and flowing wellhead temperature data;

determining, in response to determining the predicted production rate, an adjusted parameter for the well system based on the predicted production rate, wherein the adjusted parameter corresponds to a well system parameter among the plurality of well system parameters; and transmitting automatically one or more commands to a choke assembly in the well system to implement the adjusted parameter.

14. The non-transitory computer readable medium of claim 13, wherein the instructions further comprise functionality for:

generating a plurality of production curves using the calibrated production model, wherein the plurality of production curves correspond to different water cut levels; and selecting a production curve from the plurality of production curves using the water cut data, and wherein the predicted production rate is determined using the selected production curve.

15. The non-transitory computer readable medium of claim 13, wherein the first wellhead temperature data is obtained using a plurality of choke settings in a well control system.

16. The non-transitory computer readable medium of claim 13, wherein the instructions further comprise functionality for:

determining, based on a predetermined heat transfer function, a plurality of heat transfer values using the ambient temperature data and the first wellhead temperature data, wherein the production model is calibrated by calibrating a heat transfer coefficient of the predetermined heat transfer function using the plurality of heat transfer values.

17. The non-transitory computer readable medium of claim 13, wherein the instructions further comprise functionality for:

determining a change in a production rate of the wellhead has occurred; and obtaining, in response to determining that the change has occurred, second wellhead temperature data and second production data regarding the wellhead; and calibrating the calibrated production model using the second wellhead temperature data and the second production data.

* * * * *